(12) United States Patent
Teflioudi et al.

(10) Patent No.: US 11,386,102 B2
(45) Date of Patent: Jul. 12, 2022

(54) RELEASE OF LATCHES FOR GARBAGE COLLECTION

(71) Applicant: SAP SE, Walldorf (DE)

(72) Inventors: Christina Teflioudi, Heidelberg (DE); Paul Willems, Heidelberg (DE); Till Merker, Sandhausen (DE)

(73) Assignee: SAP SE, Walldorf (DE)

( * ) Notice: Subject to any disclaimer, the term of this patent is extended or adjusted under 35 U.S.C. 154(b) by 559 days.

(21) Appl. No.: 16/371,609

(22) Filed: Apr. 1, 2019

(65) Prior Publication Data

US 2020/0311069 A1    Oct. 1, 2020

(51) Int. Cl.
*G06F 16/20* (2019.01)
*G06F 16/2458* (2019.01)
*G06F 9/52* (2006.01)
*G06F 9/54* (2006.01)

(52) U.S. Cl.
CPC ............ *G06F 16/2474* (2019.01); *G06F 9/52* (2013.01); *G06F 9/541* (2013.01)

(58) Field of Classification Search
None
See application file for complete search history.

(56) References Cited

U.S. PATENT DOCUMENTS

| | | | | |
|---|---|---|---|---|
| 5,093,912 A | * | 3/1992 | Dong | G06F 9/5061 718/104 |
| 7,769,792 B1 | * | 8/2010 | Burrows | G06F 16/93 707/814 |
| 2008/0005112 A1 | * | 1/2008 | Shavit | G06F 9/526 |
| 2016/0147814 A1 | * | 5/2016 | Goel | G06F 16/2336 707/600 |

* cited by examiner

*Primary Examiner* — Belix M Ortiz Ditren
(74) *Attorney, Agent, or Firm* — Mintz Levin Cohn Ferris Glovsky and Popeo, P.C.

(57) ABSTRACT

A query is received at a database execution engine. The query is executed by the database execution engine, the executing including executing one or more threads that operate on versions of data of the delta fragment; acquiring and releasing, by a first thread, a latch on a first version of the data of the delta fragment, the releasing is performed prior to the first thread entering a wait state; and reclaiming the first version of the data of the delta fragment from memory and during execution of the query. Related systems, methods, and articles of manufacture are also described.

20 Claims, 4 Drawing Sheets

RELEASE OF LATCHES FOR GARBAGE COLLECTION

TECHNICAL FIELD

The subject matter described herein relates to database management, and more particularly, query execution.

BACKGROUND

Database management systems have become an integral part of many computer systems. For example, some systems handle hundreds if not thousands of transactions per second. On the other hand, some systems perform very complex multidimensional analysis on data. In both cases, the underlying database may need to handle responses to queries very quickly in order to satisfy systems requirements with respect to transaction time. Given the complexity of these queries and/or their volume, the underlying databases face challenges in order to optimize performance.

SUMMARY

In an aspect, a query is received at a database execution engine. The query is executed by the database execution engine, the executing including executing one or more threads that operate on versions of data of the delta fragment; acquiring and releasing, by a first thread, a latch on a first version of the data of the delta fragment, the releasing is performed prior to the first thread entering a wait state; and reclaiming the first version of the data of the delta fragment from memory and during execution of the query.

One or more of the following features can be included in any feasible combination. For example, that a second version of the data of the delta fragment has been created and that no processes are holding latches to the first version of the data of the delta fragment can be identified during execution of the query. A result to the query can be determined. The executing the query can include processing a plurality of operators of the query while the latch has been acquired and releasing of the latch can be performed after the processing of the plurality of operators and in response to determining that the first thread is entering the wait state. The executing the query can include acquiring a second latch to a second version of the data of the delta fragment and after the first latch has been released. The latch can provide non-exclusive read access for a holder of the latch. The reclaiming can include executing a garbage collection process for the first version of the data of the delta fragment. The executing of the query can include instantiating the first thread for performing a first set of operators on the database; instantiating a second thread for performing a second set of operators on the database; and initiating execution of the first thread and the second thread. A master thread can be instantiated. The executing of the query can include identifying that at least one process is holding an associated latch to the first version of the data of the delta fragment; and waiting for a period of time before checking whether there are processes holding a respect latch to the first version of the data of the delta fragment. The executing of the query can include periodically checking, during execution of the query, whether processes are holding associated latches to the first version of the data of the delta fragment. The acquiring and releasing can be performed by an execution engine application programming interface forming part of the database execution engine. The database execution engine can include a query optimizer and a query execution engine coupled to the query optimizer, the query optimizer including: an execution interface, a cost function, and a plan compiler including a plan generator; the query execution engine including: an execution interface, a plan execution, precompiled operations, code generated operations, and an execution engine application programming interface, with the acquiring and releasing performed by the execution engine application programming interface.

Implementations of the current subject matter can include systems and methods consistent with the present description, including one or more features as described, as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
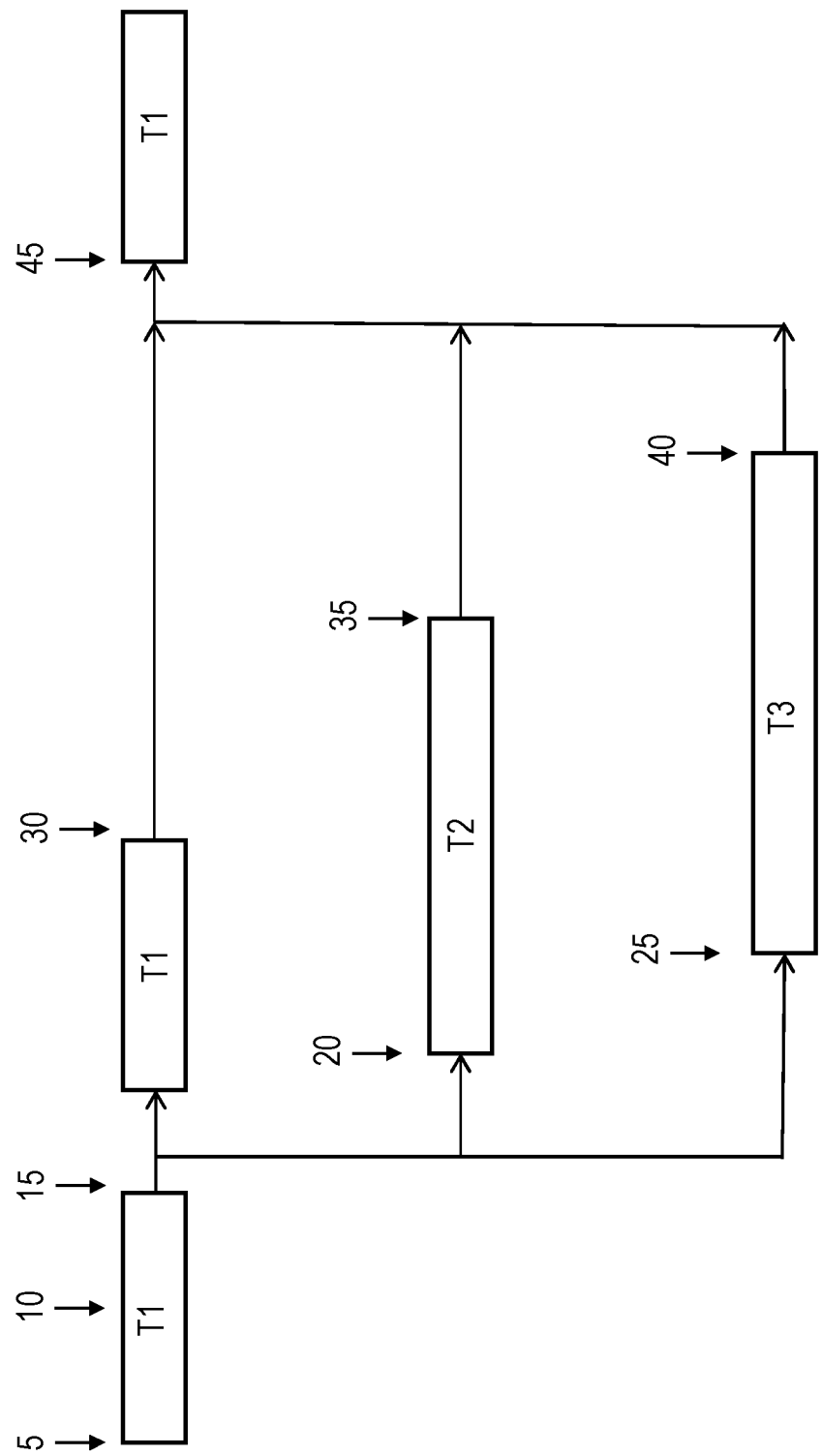
FIG. 1 is a diagram illustrating thread execution over time.

Some database management systems and operations performed by the database management systems operate on tables that include partitions or fragments. A fragment can be a main fragment, which is compressed and not easily written to, and a delta fragment, which can be utilized for inserts and modifications to the data. The delta fragment is periodically merged into the main fragment.

Changes to the delta fragment can be viewed as a stream of modifications (e.g., inserts, writes, and the like) that occur over time. Initially, the delta fragment is allocated an amount of memory for storing the modifications. As modifications are made, the delta fragment grows in size. If the size of the data of the delta fragment is approaching the size of the current memory allocation, a new version of the data of the delta fragment can be created with the new delta fragment allocation being larger in size (e.g., a greater amount of memory allocation). The first version of values of the delta fragment are copied into the new (e.g., second) version of the values, and subsequent modifications are added to the second version of the values. But because operators (e.g., executed by different threads) may be utilizing the first version of the values, the memory allocated to the first version of the values cannot be immediately reclaimed, for example, via a garbage collection process. Accordingly, the first version can only be reclaimed when no operator or thread is reading (e.g., using) the first version of the values.

For example, a dictionary in one column of a delta fragment (which can include multiple columns) can be stored in a vector (e.g., plain array) of currently size 10. When the $11^{th}$ value is inserted, the buffer is too small. A new buffer of a larger size (e.g., 20) is allocated, the old 10 values in addition to the new value (the $11^{th}$ value) are copied to the new buffer. But the old buffer cannot be freed as long as any readers might have a reference (e.g., pointer) to it. Accordingly, before getting a pointer to any version of data in a delta fragment, any reader obtains a latch to fix this version of the vector from being garbage collected while it is needed.

A latch can refer to a synchronization mechanism for enforcing limits on access to a resource in an environment where there are many threads of execution. A thread can acquire and hold a latch to a version of data of a delta fragment. Such a latch can provide for non-exclusive read access for the thread holding the latch, such that the version of the data of the delta fragment to which the latch is associated cannot be removed so long as the thread holds the latch. The latch can be considered to include a traditional lock or a lock free-mechanism (e.g., atomic operations are employed, but full-fledged synchronization is not performed, which might even make the thread wait and yield). In some database systems, a latch can be obtained by increasing a reference count (e.g., REFCOUNT) of the version of the data to which the latch is being obtained. To release a latch, the reference count can be decreased.

One approach to controlling when to acquire and release latches on versions of data of the delta fragments can include acquiring all latches at the beginning of a query and releasing all latches at the end of the query. But if a query requires a substantial amount of time to execute, no garbage collection can occur during that time and substantial memory usage may occur. Another approach to controlling when to acquire and release latches on versions of data of the delta fragments can include, for a query plan including a number of operators, acquiring a latch before each operator and releasing the latch after each respective operator has completed processing. But such an approach can be inefficient because acquiring and releasing a latch requires significant overhead in resources.

Some implementations of the current subject matter include an approach for acquiring, releasing, and reacquiring latches on versions of data of the delta fragment in a manner that allows for efficient processing and use of computing resources. Such an approach can include periodically (e.g., from time to time) identifying times during query execution where it is safe to perform garbage collection. In some implementations, the current subject matter can include identifying that a latch to one version of data of a delta fragment can be released and a new latch to a current version of the data of the delta fragment can be subsequently acquired, thereby freeing the old version so that garbage collection can occur. In some implementations, latches can be released prior to a thread entering a wait state, thereby allowing for garbage collection to ensue during waiting states.

For example, FIG. 1 is a diagram illustrating thread execution over time. Time is represented as increasing from left to right. At 5, a first thread T1 is instantiated (e.g., created) and initiates execution including acquiring a latch to a first version of data of a delta fragment. T1 can be considered a master thread. T1 executes (represented by the horizontal block) including utilizing (e.g., reading from) the first version of the data of the delta fragment. At 10, a new version (e.g., second version) of the data of the delta fragment is created, for example, to allow for the delta fragment to grow in size. At 15, T1 instantiates (e.g., via a fork or branch) two additional threads T2 and T3, each to perform separate tasks. At 20, T2 initiates execution including acquiring a latch to the new (e.g., second) version of the data of the delta fragment, after which a third version of the data of the delta fragment is created. At 25, T3 initiates execution including acquiring a latch to the third version of the data of the delta fragment and initiates execution.

At 30, thread T1 enters a wait state. The wait state can be entered into for a number of reasons, such as if further execution of T1 requires threads T2 and T3 to finish. Similarly, the wait state can be entered into, for example, in a distributed database system where the thread T1 has requested data from a remote compute node and the thread T1 is waiting during a delay period (e.g., caused by the network). Prior to, in response to, and/or upon entering the wait state, the thread T1 can release the latch it is holding to the first version of the data of the delta fragment. By not holding the latch during the wait state, the first version of the data of the delta fragment is no longer being read by a thread, is not the most current version of the data of the delta fragment, and therefore is available for garbage collection (e.g., the memory allocated for the first version of the data of the delta fragment can be reclaimed).

At 35, thread T2 can finish processing and release its latch on the second version of the data of the delta fragment. By releasing the latch after completing processing, the second version of the data of the delta fragment is no longer being read by a thread, is not the most current version of the data of the delta fragment, and therefore is available for garbage collection (e.g., the memory allocated for the second version of the data of the delta fragment can be reclaimed).

At 40, thread T3 can finish processing and release its latch on the third version of the data of the delta fragment. By releasing the latch after completing processing, the third version of the data of the delta fragment is no longer being read by a thread, but because it is the most current version of the data of the delta fragment it is therefore not available for garbage collection (e.g., the memory allocated for the third version of the delta fragment is not reclaimed).

At 45, thread T1 can exit the wait state and initiate further execution. At this point, if thread T1 needs to utilize the data of the delta fragment, thread T1 can acquire the latch to the third version of the data of the delta fragment. Thus, by releasing and reacquiring latches to versions of the data of the delta fragment during execution of the query (e.g., during waiting states or periods), garbage collection processing can be enabled and thus improved system performance.

Figure 2:
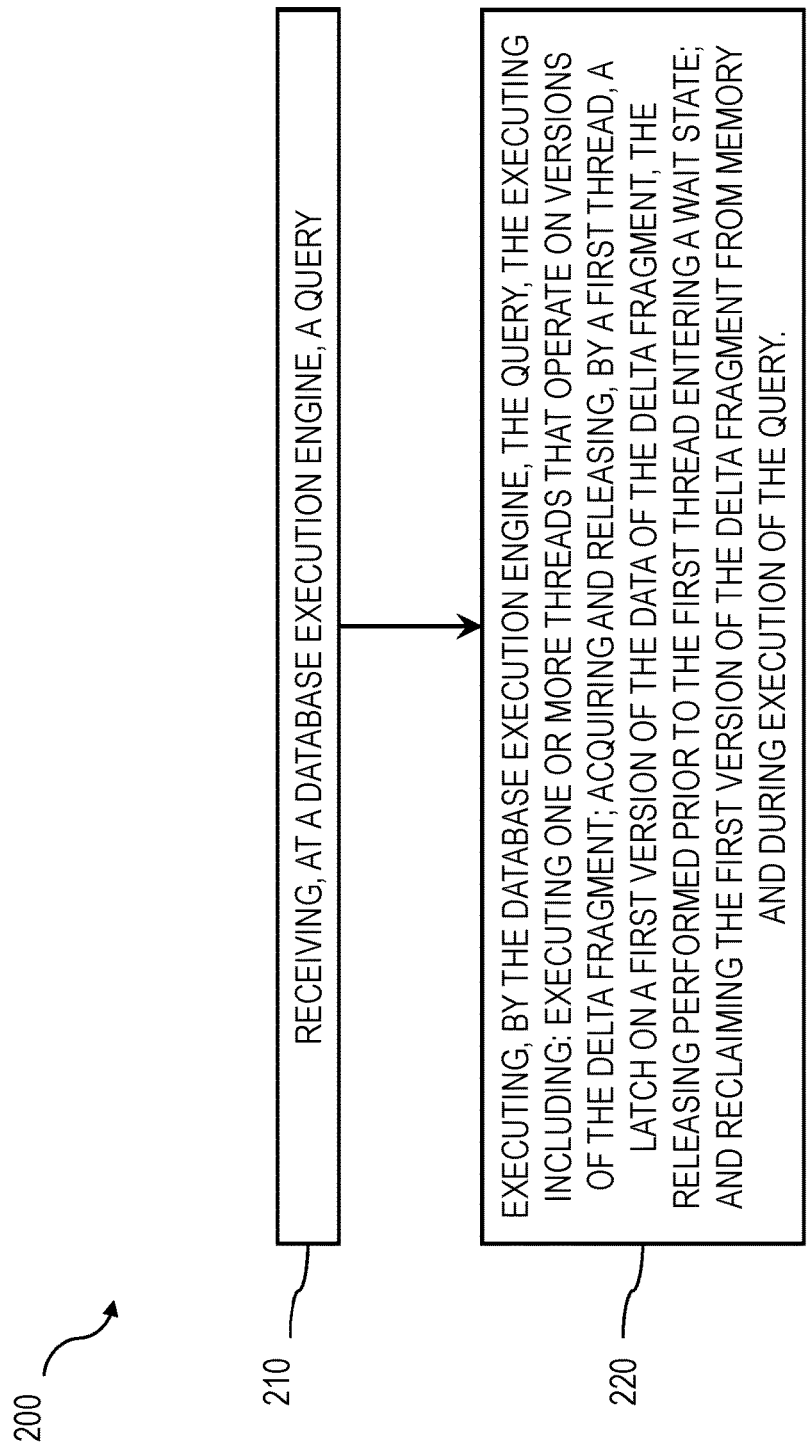
FIG. 2 is a process flow diagram illustrating an example process that can enable improved database management system performance.

FIG. 2 is a process flow diagram illustrating an example process 200 that can enable improved database management system performance. At 210, a query is received at a database execution engine. A query execution plan (or query plan for short) may be generated. The query plan represents a sequence of operations, such as instructions, commands, and/or the like, to access data in the database. The database may also include a query plan optimizer to determine an efficient way to execute the query plan. Versions of the data of the delta fragment can be created by multiple operators, threads, and the like, operating on the database which may be included in the query or another query and/or operations.

At 220, the query can be executed. The query execution can be by the database execution engine and can utilize the query plan. The executing can include executing one or more threads that operate on the versions of the data of the delta fragment; acquiring and releasing, by a first thread, a latch on a first version of the data of the delta fragment, and where the releasing is performed prior to the first thread entering a wait state; and reclaiming the first version of the data of the delta fragment from memory and during execution of the query.

For example, referring again to the thread execution described above with respect to FIG. 1, versions of data of the delta fragments are created due to operation of the database (e.g., when additional space is required). Threads (e.g., T1, T2, and T3) of a query execution operate on the different versions of the data of the delta fragment. As described with reference to FIG. 1, a latch held by thread T1 to the first version of the data of the delta fragment can be released prior to a wait period or state of the thread (e.g., while the thread is waiting for another thread to complete execution, for data to be received from a remote compute node, and the like).

In some implementations, it can then be identified, for the first version of the data of the delta fragment, that a second version of the data of the delta fragment has been created and that no processes are holding a latch to the first version of the data of the delta fragment. Based on the identifying, the first version of the data of the delta fragment can be reclaimed from memory and during execution of the query, for example, with a garbage collection process.

In some implementations, executing the query can include acquiring a first latch to the first version of the data of the delta fragment by a first thread; processing a plurality of operators of the query while the first latch has been acquired; and releasing, after the processing, the first latch. In some implementations, a second latch to the second version of the data of the delta fragment can be acquired by the first thread after the first latch has been released.

The reclaiming of the first version of the data of the delta fragment can include executing a garbage collection process for the first version of the data of the delta fragment. For example, the garbage collection algorithm can utilize the reference count for each version of the data. When a thread releases a latch, the reference count for the data version is decreased. If the reference count is equal to 0, and the version of the data is not the most current, the thread that releases the latch can perform the garbage collection, in which the data items with zero reference count are deleted.

In some implementations, executing of the query can include instantiating a first thread for performing a first set of operators on the database; instantiating a second thread for performing a second set of operators on the database; and initiating execution of the first thread and the second thread. The identifying can be performed during a wait period of the first thread. In some implementations, a master thread can be instantiated.

In some implementations, the executing of the query can include identifying that at least one process is holding an associated latch to the first version of the data of the delta fragment and waiting for a period of time before checking whether there are processes holding a respect latch to the first version of the data of the delta fragment. For example, the executing of the query can include periodically checking, during execution of the query, whether processes are holding associated latches to the first version of the data of the delta fragment. In some implementations, a result to the query can be returned.

Database management systems and operations performed on the data managed by a database management system have become increasingly complex. For example, a database management systems (or database for short) can support relatively complex online analytical processing (OLAP, which can perform multi-dimensional analysis) to more straightforward transaction based online transaction processing (OLTP). Moreover, the database may be configured as a row-store database or column store database, each of which may have certain aspects with respect to queries and other operations at the database. For example, the database may encode data using dictionaries, while some databases may not. In addition to these various databases layer differences, the queries performed at a database can comprise a complex sequence of operations in order to generate corresponding responses. To implement the complex sequence, a query execution plan (or query plan for short) may be implemented. The query plan represents a sequence of operations, such as instructions, commands, and/or the like, to access data in the database. The database may also include a query plan optimizer to determine an efficient way to execute the query plan.

From an application or client perspective, it can be extremely cumbersome to access databases. For example, an application may need to query different types of databases using complex queries. As a consequence, the application layer in this example would need to be configured to handle the various types of databases and the various query types. Additionally or alternatively, each database may need to process queries from the application into a format and structure that can be handled by the given database. Pushing complex operations and support for a variety of different database types to the application layer may contravene the need to have relatively lighter weight and/or readily deployable applications. On the other hand, pushing complex operations to the database layer where data is stored may draw processing and/or memory resources at the database and may thus reduce the performance and response times for queries on that database layer.

In some example embodiments, there may be provided an execution engine that may decouple the higher-level, application layer from the database layer (e.g., the persistence or storage layer where data including database tables may be stored and/or queried using instructions, such as commands and/or the like). The execution engine may be implemented separately from the database layer and/or the application layer. Furthermore, the execution engine may be configured to receive a query, generate a query plan (including for example query algebra), optimize the query plan, and/or generate executable code, which can be executed at runtime. The executable code may include pre-compiled code (which can be selected for certain operations in the query plan) and/or code that is generated just-in-time specifically for execution of the query plan. In some implementations, the execution engine can utilize the intelligent release and acquisition of latches as described above with respect to FIGS. 1-2.

The execution engine may be configured to perform some operations itself, while the execution engine may send some operations (e.g., relatively basic commands, such as reads, writes, scans, and/or the like) to the database layer. Furthermore, the execution engine may receive corresponding responses from the database layer where data is stored/persisted and certain commands, such as reads, writes, scans, and/or the like, can be performed. The execution engine may perform more complex execution operations, such as rule-based operations including relatively more complex operations such as joins, projections, and/or the like, while accessing the database's storage/persistence layer when needed to read, write, update, and/or perform other operations.

The execution engine may be configured to support a wide range of database types to reduce, if not eliminate, the need for specialized execution engines for each type of database. For example, rather than having an execution engine for each type of database (e.g., an execution engine for an OLAP database, another execution engine for an OLTP database, an execution engine for a row-store database, an execution engine for a column-store database, and/or the like), the execution engine disclosed herein can perform query execution for a variety of database types and send queries to the different types of database layers (and/or their storage/persistence layer) and handle the corresponding responses.

Figure 3:
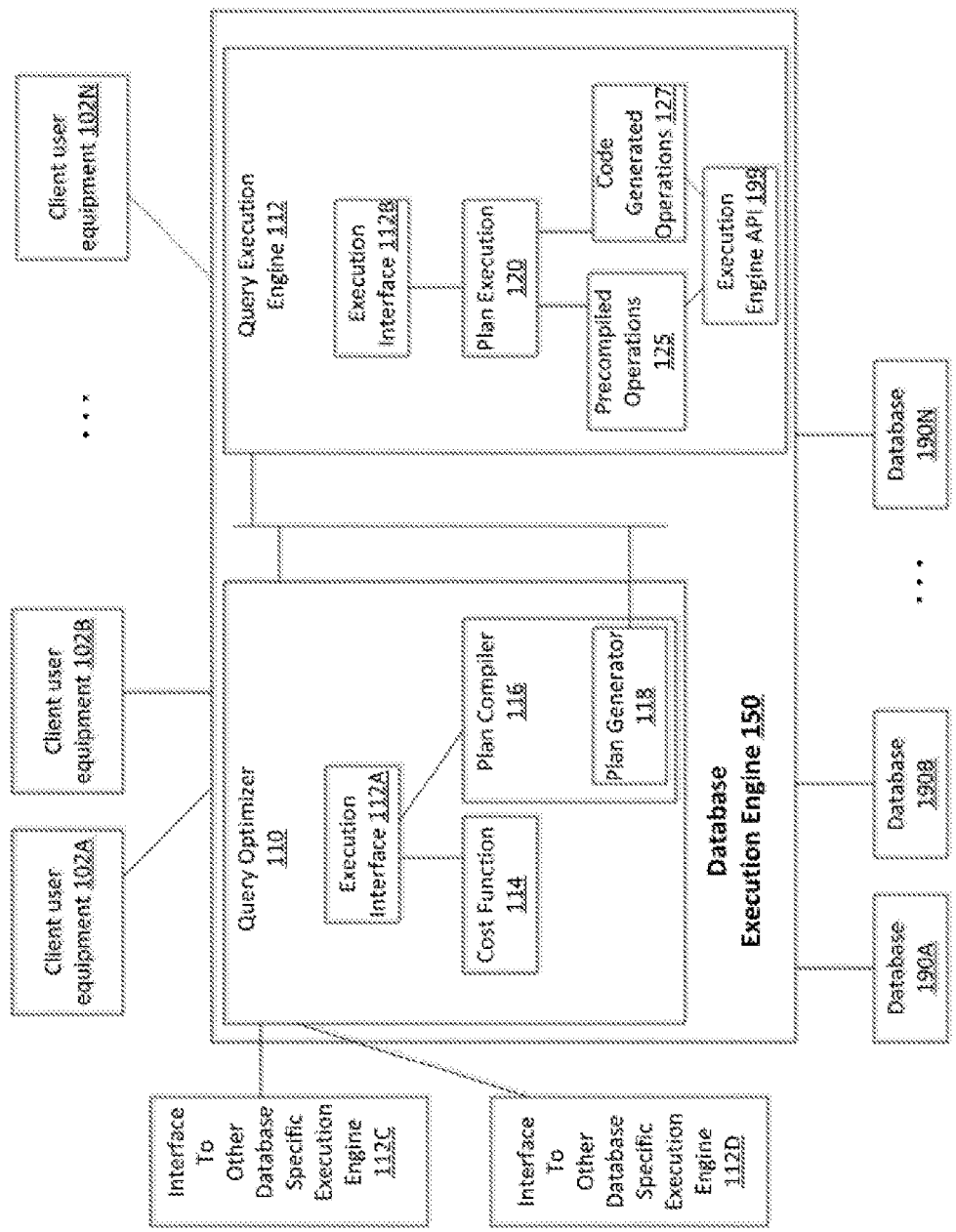
FIG. 3 depicts an example of a system, in accordance with some example implementations.

FIG. 3 depicts an example of a system 100, in accordance with some example implementations.

The system 100 may include one or more user equipment 102A-N, such as a computer, a smart phone, a tablet, an Internet of Things (IoT) device, and/or other computer or processor-based devices. The user equipment may include a user interface, such as a browser or other application to enable access to one or more applications, database layer(s), and/or databases, to generate queries to one or more databases 190A-N, and/or to receive responses to those queries.

In the example of FIG. 3, the databases 190A represent the database layer of a database management system where data may be persisted and/or stored in a structured way, and where the data can be queried or operated on using operations including SQL commands or other types of commands/instructions to provide reads, writes, and/or perform other operations. To illustrate by way of an example, user equipment 102A-N may send a query via an execution engine 150 to the database layer 190A-B, which may represent a persistence and/or storage layer where database tables may be stored and/or queried. The query may be sent via a connection, such as a wired and/or wireless connection (e.g., the Internet, cellular links, WiFi links, and/or the like).

The database execution engine 150 may include a query optimizer 110, such as a SQL optimizer and/or another type of optimizer, to receive at least one query from a user equipment and generate a query plan (which may be optimized) for execution by the execution engine 112. The query optimizer 110 may receive a request, such as a query, and then form or propose an optimized query plan. The query plan (which may be optimized) may be represented as a so-called "query algebra" or "relational algebra."

For example, SELECT Columns from Table A and Table B, and perform an INNER JOIN on Tables A and B may represent a query received by the database execution engine 150 including the query optimizer 110. There may be several ways of implementing execution of this query. As such, the query plan may offer hints or propose an optimum query plan with respect to the execution time of the overall query. To optimize a query, the query plan optimizer 110 may obtain one or more costs for the different ways the execution of the query plan can be performed. The costs may be obtained via the execution interface 112A from a cost function 114, which responds to the query optimizer 110 with the cost(s) for a given query plan (or portion thereof), and these costs may be in terms of execution time at the database layer 190A-N, for example.

The query optimizer 110 may form an optimum query plan, which may represent a query algebra, as noted above. To compile a query plan, the query optimizer 110 may provide the query plan to the query plan compiler 116 to enable compilation of some, if not all, of the query plan. The query plan compiler 116 may compile the optimized query algebra into operations, such as program code and/or any other type of command, operation, object, or instruction. This code may include pre-compiled code (which can be pre-compiled and stored, and then selected for certain operations in the query plan) and/or just-in-time code generated specifically for execution of the query plan. For example, plan compiler may select pre-compiled code for a given operation as part of the optimization of the query plan, while for another operation in the query plan the plan compiler may allow a compiler to generate the code. The pre-compiled and generated code represent code for executing the query plan, and this code may be provided to the plan generator 118, which interfaces the query execution engine 112.

In some implementations, the query optimizer 110 may optimize the query plan by compiling and generating code. Moreover, the query optimizer 110 may optimize the query plan to enable pipelining during execution.

In some implementations, the query optimizer 110 may be configured to select other execution engines. For example, the query optimizer 110 may select via interface 112C an execution engine configured specifically to support a row-store database or an ABAP type database, or the query optimizer 110 may select via interface 112D an execution engine configured specifically to support a column-store type database. In this way, the query optimizer 110 may select whether to use the universal database execution engine 150 or legacy (e.g., database-specific) execution engines (available via interfaces 112C/D, for example).

The query execution engine 112 may receive, from the plan generator 118, compiled code to enable execution of the optimized query plan, although the query execution engine may also receive code or other commands directly from a higher-level application or other device, such as user equipment 102A-N.

The query execution engine 112 may then forward, via an execution interface 112B, the code to a plan execution engine 120. The plan execution engine may then prepare the plan for execution, and this query plan may include pre-compiled code 125 and/or generated code 127. When the code for the query plan is ready for execution during runtime, the query execution engine 112 may step through the code performing some of the operations within the database execution engine 150 and sending some of the operations (or commands in support of an operation, such as a read, write, and/or the like) to the execution engine application programming interface (API) 199 for execution at one or more of databases layers 190A-N. In some implementations, the execution engine API 199 can implement or enable the identifying, for a first version of the data of the delta fragment, that a second version of the data of the delta fragment has been created and that no processes are holding a latch to the first version of the data of the delta fragment and reclaiming, based on the identifying, the first version of the data of the delta fragment from memory and during execution of the query.

In some implementations, the query execution engine 150 may, as noted, be configured to handle different types of databases and the corresponding persistent layers and/or tables therein. For example, the database 190N may be implemented as a row-oriented database, so that an insert is performed by adding a row with a corresponding row identifier, while another database 190A may be implemented as a column store database, which may use dictionaries and compressive techniques when inserting data into a table. In this example, the query execution engine 150 may perform execution related to handling the differences between these two types of databases. This may enable a reduction in processing at the database layer 190A-N. Moreover, the query execution engine 150 may perform other operations including rule-based operations, such as joins and projections, as well as filtering, group by, multidimensional analysis, and/or the like to reduce the processing burden on the database layer. In this way, the query execution engine 150 may execute these and other complex operations, while the database's persistence/storage layer 190A-N can perform simpler operations to reduce the processing burden at the database's persistence/storage layer 190A-N.

In some example embodiments, the query execution engine 150 may run, as noted above, just-in-time code 127 generated for some query operations, while pre-compiled code 125 may be run for other operations. Moreover, the query execution engine 150 may combine the generated code 127 with pre-compiled code 125 to further optimize execution of query related operations. In addition, the query execution engine 150 may provide for a plan execution framework that is able to handle data chunk(s), pipelining, and state management during query execution. Furthermore, the query execution engine 150 may provide the ability to access table storage via an abstract interface to a table adapter, which may reduce dependencies on specific types of storage/persistence layers (which may enable use with different types of storage/persistence layers).

In some example embodiments, the database execution engine 150 may be provided with at least one table adapter. In some example embodiments, the table adapter may generate an object, such as a table object, which can be stored in cache with other code, objects, and/or the like awaiting runtime execution of the query. In some example embodiments, and the table object can be opened, during query execution, to provide access to a table stored in the persistence layer of a database.

Figure 4:
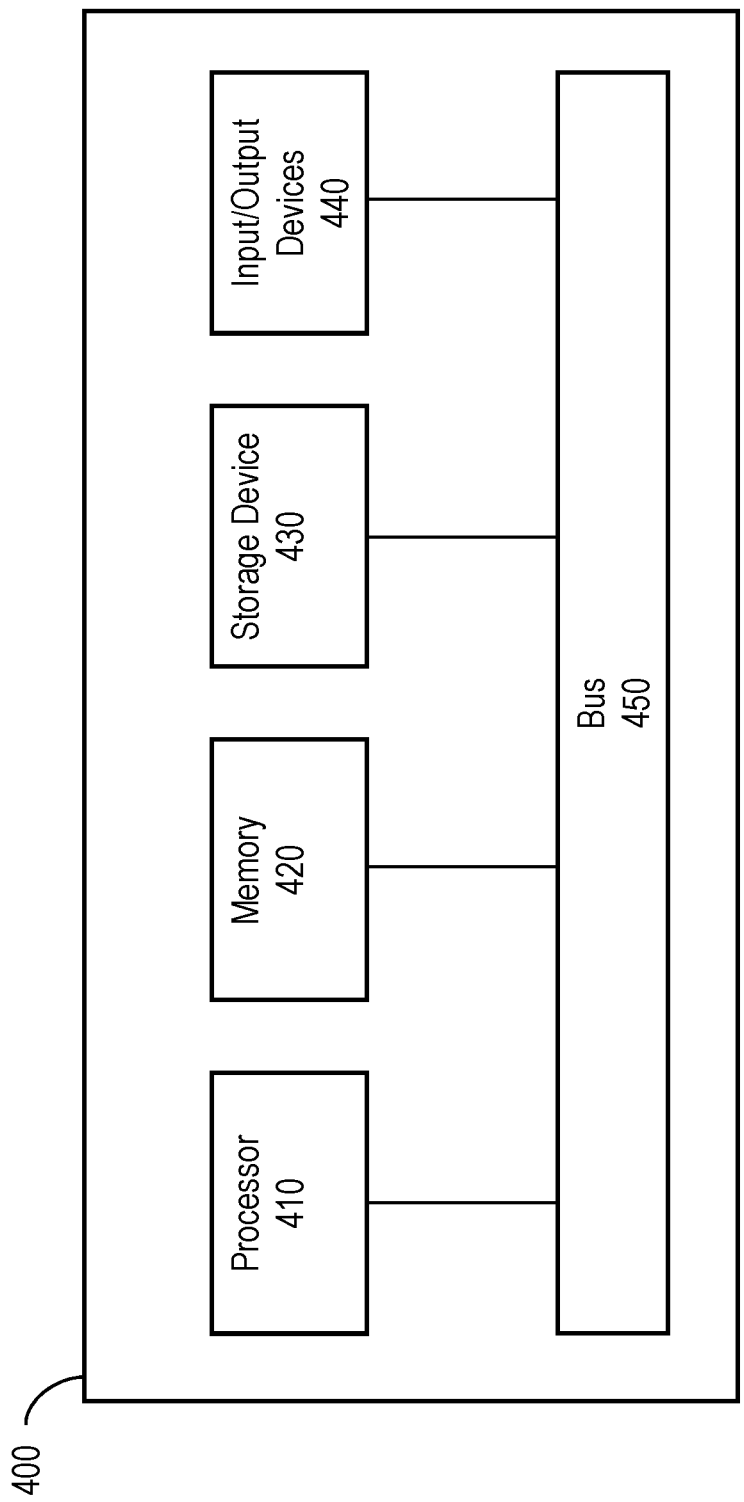
FIG. 4 depicts a block diagram illustrating a computing system consistent with some implementations of the current subject matter.

FIG. 4 depicts a block diagram illustrating a computing system 400 consistent with implementations of the current subject matter. Referring to FIGS. 3 and 4, the computing system 400 can be used to implement the database management system 110 and/or any components therein.

As shown in FIG. 4, the computing system 400 can include a processor 410, a memory 420, a storage device 430, and input/output device 440. The processor 410, the memory 420, the storage device 430, and the input/output device 440 can be interconnected via a system bus 450. The processor 410 is capable of processing instructions for execution within the computing system 400. Such executed instructions can implement one or more components of, for example, the database management system 110. In some example embodiments, the processor 410 can be a single-threaded processor. Alternately, the processor 410 can be a multi-threaded processor. The processor 410 is capable of processing instructions stored in the memory 420 and/or on the storage device 430 to display graphical information for a user interface provided via the input/output device 440.

The memory 420 is a computer readable medium such as volatile or non-volatile that stores information within the computing system 400. The memory 420 can store data structures representing configuration object databases, for example. The storage device 430 is capable of providing persistent storage for the computing system 400. The storage device 430 can be a floppy disk device, a hard disk device, an optical disk device, a tape device, a solid-state device, and/or any other suitable persistent storage means. The input/output device 440 provides input/output operations for the computing system 400. In some example embodiments, the input/output device 440 includes a keyboard and/or pointing device. In various implementations, the input/output device 440 includes a display unit for displaying graphical user interfaces.

According to some example embodiments, the input/output device 440 can provide input/output operations for a network device. For example, the input/output device 440 can include Ethernet ports or other networking ports to communicate with one or more wired and/or wireless networks (e.g., a local area network (LAN), a wide area network (WAN), the Internet).

In some example embodiments, the computing system 400 can be used to execute various interactive computer software applications that can be used for organization, analysis and/or storage of data in various formats. Alternatively, the computing system 400 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 440. The user interface can be generated and presented to a user by the computing system 400 (e.g., on a computer screen monitor, etc.).

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

The illustrated methods are exemplary only. Although the methods are illustrated as having a specific operational flow, two or more operations may be combined into a single operation, a single operation may be performed in two or more separate operations, one or more of the illustrated operations may not be present in various implementations, and/or additional operations which are not illustrated may be part of the methods.

What is claimed is:

1. A system comprising:
   at least one data processor; and
   at least one memory storing instructions which, when executed by the at least one data processor, result in operations comprising:
   receiving, at a database execution engine, a query;
   executing, by the database execution engine, the query, the executing including:
   executing one or more threads that operate on versions of data of the delta fragment;
   acquiring and releasing, by a first thread, a latch on a first version of the data of the delta fragment, wherein the releasing is performed prior to the first thread entering a wait state; and
   reclaiming the first version of the data of the delta fragment from memory and during execution of the query.

2. The system of claim 1, the operations further comprising:
   identifying, for the first version of the data of the delta fragment, that a second version of the data of the delta fragment has been created and that no processes are holding latches to the first version of the data of the delta fragment, the identifying performed during execution of the query.

3. The system of claim 1, the operations further comprising:
   returning a result to the query.

4. The system of claim 1, the executing the query further comprising:
   processing a plurality of operators of the query while the latch has been acquired;
   wherein releasing of the latch is performed after the processing of the plurality of operators and in response to determining that the first thread is entering the wait state.

5. The system of claim 1, the executing the query further comprising:
   acquiring a second latch to a second version of the data of the delta fragment and after the latch has been released.

6. The system of claim 1, wherein the latch provides non-exclusive read access for a holder of the latch.

7. The system of claim 1, wherein the reclaiming includes executing a garbage collection process for the first version of the data of the delta fragment.

8. The system of claim 1, the executing of the query further comprising:
   instantiating the first thread for performing a first set of operators on the database;
   instantiating a second thread for performing a second set of operators on the database; and
   initiating execution of the first thread and the second thread.

9. The system of claim 8, the operations further comprising:
   instantiating a master thread.

10. The system of claim 1, the executing of the query further comprising:
identifying that at least one process is holding an associated latch to the first version of the data of the delta fragment; and
waiting for a period of time before checking whether there are processes holding a respect latch to the first version of the data of the delta fragment.

11. The system of claim 1, the executing of the query further comprising:
periodically checking, during execution of the query, whether processes are holding associated latches to the first version of the data of the delta fragment.

12. The system of claim 1, wherein the acquiring and releasing is performed by an execution engine application programming interface forming part of the database execution engine.

13. The system of claim 1, wherein the database execution engine includes a query optimizer and a query execution engine coupled to the query optimizer, the query optimizer including: an execution interface, a cost function, and a plan compiler including a plan generator; the query execution engine including: an execution interface, a plan execution, precompiled operations, code generated operations, and an execution engine application programming interface, wherein the acquiring and releasing is performed by the execution engine application programming interface.

14. A method comprising:
receiving, at a database execution engine, a query;
executing, by the database execution engine, the query, the executing including:
executing one or more threads that operate on versions of data of the delta fragment;
acquiring and releasing, by a first thread, a latch on a first version of the data of the delta fragment, wherein the releasing is performed prior to the first thread entering a wait state; and
reclaiming the first version of the data of the delta fragment from memory and during execution of the query.

15. The method of claim 14, further comprising:
identifying, for the first version of the data of the delta fragment, that a second version of the data of the delta fragment has been created and that no processes are holding latches to the first version of the data of the delta fragment, the identifying performed during execution of the query.

16. The method of claim 14, further comprising:
returning a result to the query.

17. The method of claim 14, the executing the query further comprising:
processing a plurality of operators of the query while the latch has been acquired;
wherein releasing of the latch is performed after the processing of the plurality of operators and in response to determining that the first thread is entering the wait state.

18. The method of claim 14, the executing the query further comprising:
acquiring a second latch to a second version of the data of the delta fragment and after the latch has been released.

19. The method of claim 14, wherein the latch provides non-exclusive read access for a holder of the latch.

20. A non-transitory computer readable medium storing executable instructions that, when executed by at least one processor forming part of at least one computing system, cause the at least one processor to perform operations comprising:
receiving, at a database execution engine, a query;
executing, by the database execution engine, the query, the executing including:
executing one or more threads that operate on versions of data of the delta fragment;
acquiring and releasing, by a first thread, a latch on a first version of the data of the delta fragment, wherein the releasing is performed prior to the first thread entering a wait state; and
reclaiming the first version of the data of the delta fragment from memory and during execution of the query.

* * * * *